March 21, 1967 D. J. NESIN 3,310,214

TAPE DRIVE MECHANISM

Filed March 9, 1964 2 Sheets-Sheet 1

INVENTOR.
DANIEL J. NESIN
BY
Christie, Parker & Hale
ATTORNEYS.

March 21, 1967 D. J. NESIN 3,310,214

TAPE DRIVE MECHANISM

Filed March 9, 1964 2 Sheets-Sheet 2

INVENTOR.
DANIEL J. NESIN

BY Christie, Parker & Hale
ATTORNEYS.

United States Patent Office 3,310,214

Patented Mar. 21, 1967

3,310,214

TAPE DRIVE MECHANISM

Daniel J. Nesin, Fullerton, Calif., assignor to Burroughs Corporation, Detroit, Mich., a corporation of Michigan Filed Mar. 9, 1964, Ser. No. 350,301

12 Claims. (Cl. 226—181)

This invention relates to apparatus for driving and controlling the advance of tape in recording and reproducing equipment.

In prior reeling systems used especially for magnetic recording and the like, rapid starting and stopping the tape is frequently required for such things as high speed computing apparatus. For precise accuracy, a mechanism is required capable of starting and stopping the tape quickly to begin or end a recording interval.

Prior to the present invention, the pinch rollers for the tape included a metal sleeve attached to a bearing with a resilient sleeve bonded to the exterior surface of the metal cylinder. Some problems have developed in the using of this type of pinch roller which include a low life caused by the resilient sleeve peeling from the cylinder due to the repeated deformation of the elastomer caused by driving the tape. Heat is generated in the elastomer sleeve due to the internal friction caused by the deformation which raises the operating temperature and tends to deteriorate the bond between the sleeve and the elastomer. Inherently, the metal cylinder or pinch roller requires a high energy consumption to both start and stop the pinch roller at a desired time. Also, the inherent high inertia of the metal roller has a tendency to increase braking time and energy dissipation, makes it difficult to accurately start and stop the recording device with considerable accuracy when operating under conditions such as tape feeds in the order of 100 inches per second.

In view of the above problems, the present invention provides apparatus for reducing the effective internal heat build up in the pinch roller during intermittent and sustained operation, minimizing deterioration of the resilient portion of the roller, and reducing high inertia energy consumption, thus substantially improving the life and operating characteristics of the roller and the recording device.

Briefly an embodiment of the invention comprising a first roller for engaging a member to be moved between the first roller and another roller for moving such member. The first roller comprises a rotatable member having a circular surface and an elastic and circular member. The elastic member has a surface mounted on the rotatable member surface to permit relative movement between adjoining surfaces of the elastic member and the rotatable member.

In a preferred embodiment, the present invention is particularly adapted to tape drive mechanisms which include a rotatable capstan having an axis of rotation with a flat tape extending across the rotatable capstan. A pinch roller with a distortable resilient elastomer sleeve has an axis of rotation substantially parallel to the axis of rotation of the capstan. The sleeve rotatably mounted on the outer races of a pair of bearings. A means for advancing the pinch roller toward the capstan is provided, and in doing so, the sleeve frictionally engages the tape against the capstan sufficient to advance the tape as the capstan rotates. The inner surface of the sleeve is mounted to the outer surface of the bearing races to permit relative motion between the adjacent surfaces of the sleeve and bearings.

The above as well as other features of the apparatus of the present invention may be more clearly understood with reference to the following detailed description when considered with the drawings, in which.

Figure 1:
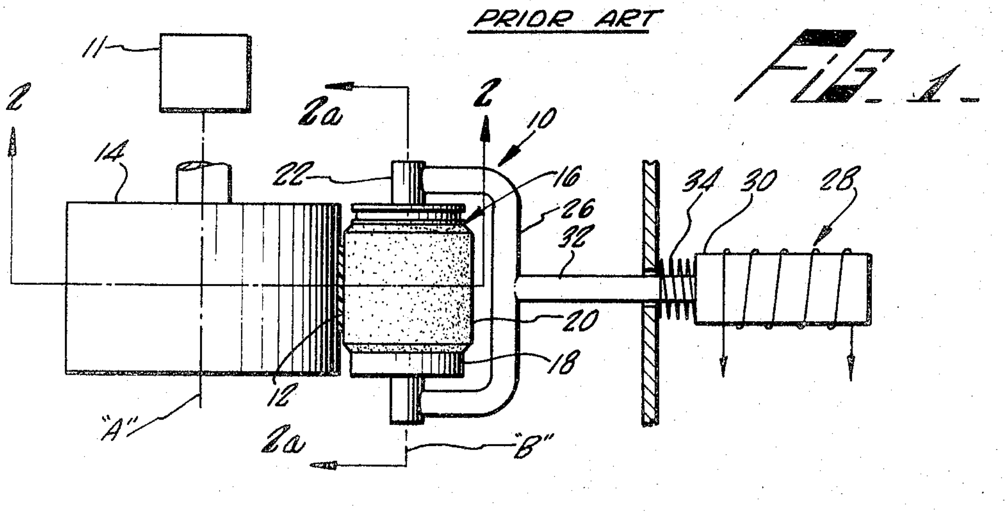
FIG. 1 is a plan view of the prior art apparatus showing the apparatus in tape advancing position.
Figures 2, 2A, 7:
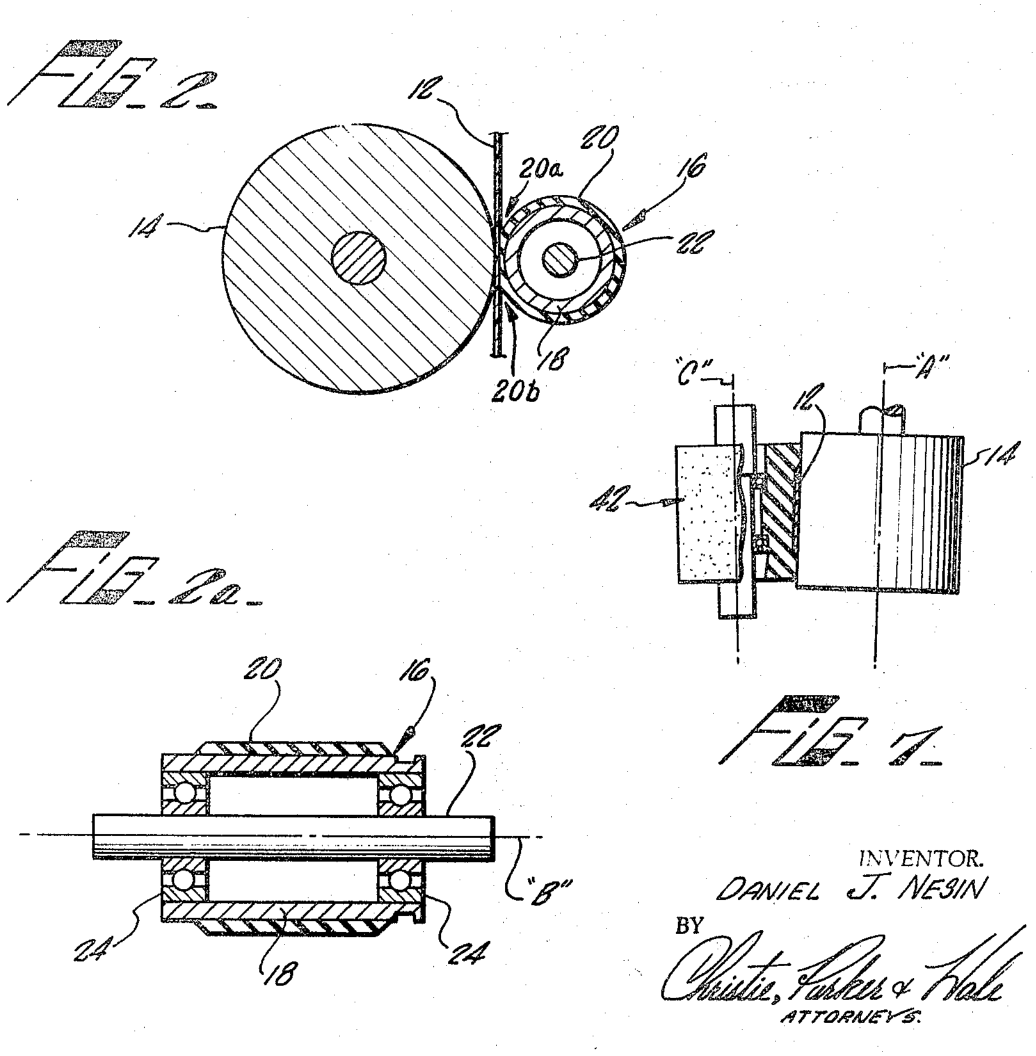
FIG. 2 is a fragmentary cross sectional view of the apparatus shown in FIG. 1, the section being taken along line 2—2 of FIG. 1.
FIG. 2A is a cross sectional view of the pinch roller constructed according to the prior art as shown in FIGS. 1 and 2, the section being taken along line 2A—2A of FIG. 1.
FIG. 7 is a cross sectional view similar to FIG. 6 with the capstan and pinch roller shown canted with relation to each other.

Referring now to FIGS. 1, 2, and 2A, the tape advancing device 10 is illustrated as constructed in the known prior art. The member to be moved is a flat magnetic tape 12 of the type commonly employed in magnetic recording and reproducing equipment may be in the form of acetate or "Mylar" polyester film. The tape is advanced past one or more magnetic recording or reproducing heads (not shown) by motor driven rotary capstan 14 fabricated of suitable metal such as stainless steel. The capstan is of generally cylindrical shape and formed with a smooth surface disposed against tape 12. Capstan 14 rotates about its axis A of rotation and receives tape 12 which extends tangential to the capstan in this instance.

A pinch roller 16 mounted for rotation about its axis B is comprised of a metal cylinder 18 having a distortable resilient elastomer sleeve 20 fixedly mounted thereon. The majority of the prior art rollers have the elastomer sleeve bonded to the cylinder such that the elastomer will rotate with the same velocity as the cylinder. Typically, the elastomer is typically fabricated from rubber having an "A" Shore hardness of 65, although the particular hardness is variable depending upon the type of operating conditions.

The roller 16 is rotatably mounted on a shaft 22 and bearings 24 carried by a yoke 26. The periphery of the roller 16 is directed toward the tape 12 on the capstan 14 and the axis B of rotation of the roller 16 is generally parallel with the axis A of rotation for the capstan 14, except for a set deliberate slight canting to steer the tape. In the disengaged position, roller 16 is in spaced relation with the tape 12 such that the tape is not advanced. A solenoid 28 is provided with a reciprocatory plunger 30 which is biased away from capstan 14. A stem 32 connects the plunger 30 and the yoke 26 so that the motion is transmitted therethrough.

With the solenoid 28 de-energized, roller 16 is in spaced relation with the tape 12 and while the motor 11 may be rotating capstan 14, the tape 12 would remain stationary and slip upon the capstan.

Upon actuation of the solenoid 28, plunger 30, stem 32, and yoke 26 are shifted toward the capstan 14 until the resilient sleeve 20 frictionally engages the tape 12. Solenoid 28 forces the roller 16 until the sleeve 20 is deformed tightly gripping the tape 12 at the point of engagement as illustrated in FIG. 2. Capstan 14 continues to frictionally drive the roller 16, and due to the engagement of the roller 16 upon the tape 12, will advance it during entire engagement of the roller 16 with the capstan 14.

After de-energization of the solenoid 28, a resilient element such as a spring 34 may force the roller 16 out of engagement with the capstan 14 and tape 12 thereby ceasing the advance of the tape.

Referring to FIG. 2, it is noted that the deformation of the elastomer sleeve noted in the drawing at 20*a* and 20*b* creates internal friction and inherent heat build up during sustained operation tends to deteriorate the elastomer and bond until at failure the elastomer bond fails resulting in elastomer peeling and possible magnetic tape damage. It will be noted that the bonding between the elastomer sleeve 20 and the metal cylinder 18 restrains movement of the elastomer sleeve relative to the metal cylinder 18. As a result, considerable stress and strain occurs from the inner to the outer surfaces of the sleeve 20 from the deformation caused by the engagement between the sleeve 20 and the capstan 14.

Figure 3:
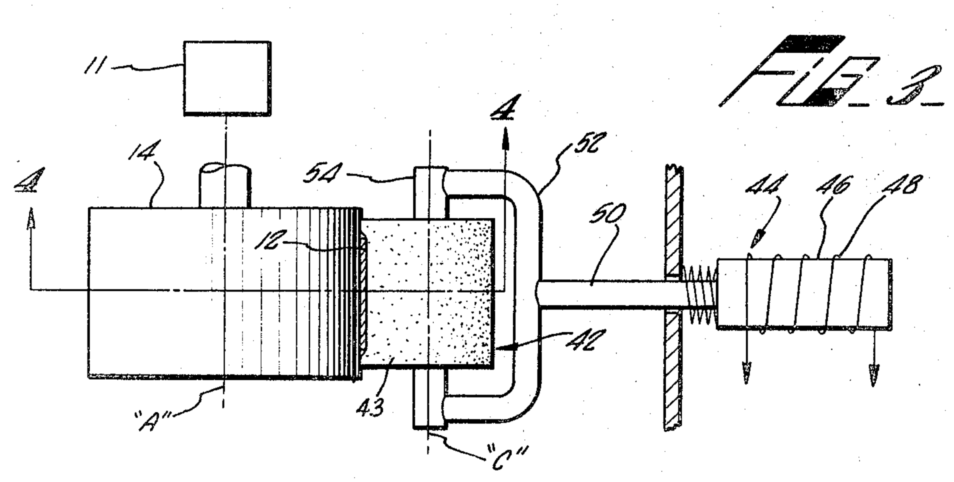
FIG. 3 is a plan view of one embodiment constructed according to the present invention.
Figure 4:
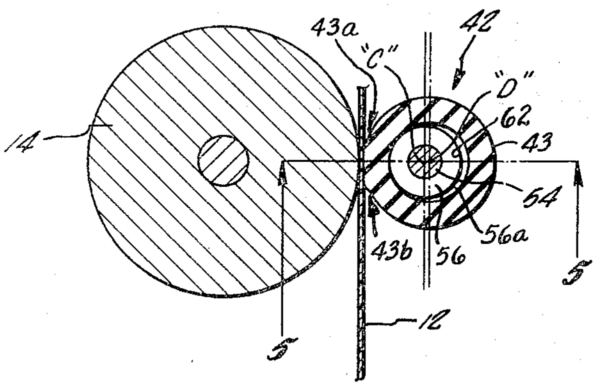
FIG. 4 is a cross sectional view of the capstan and pinch roller shown in FIG. 3, the section taken along line 4—4 of FIG. 3.
Figure 5:
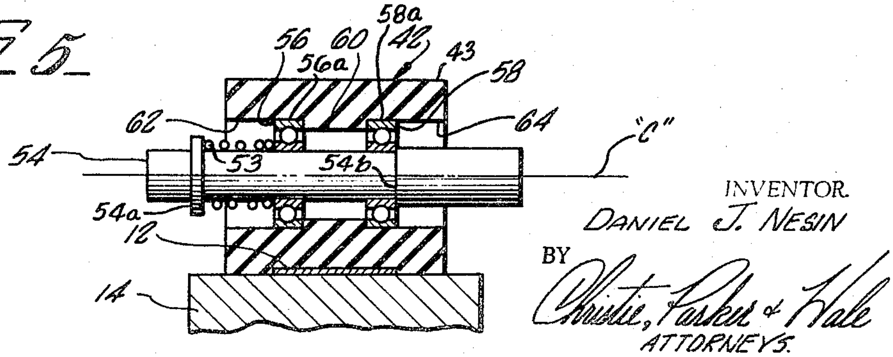
FIG. 5 is a cross sectional view of the pinch roller shown in FIGS. 3 and 4, the section taken along line 5—5 of FIG. 4.

Referring now to FIGS. 3–5, one embodiment of the tape drive mechanism 40 constructed according to the present invention will now be described. As in the prior art, the tape 12 is advanced past one or more recording reproducing heads (not shown) by a motor driven rotary capstan 14 of a suitable metal such as stainless steel. A pinch roller 42 engages and disengages the tape 12 and capstan 14. The capstan 14 has a cylindrical shape and operates in the manner similar to that in the prior art and as disclosed above.

The means for supporting and actuating the pinch roller 42 includes a solenoid 44 having a winding 48 for energizing a plunger 46 by being connected to a stem 50 and yoke 52. Shaft 54 is mounted on the yoke 52.

The pinch roller 42 has an elastomer sleeve 43 mounted on a pair of ball bearings 56 and 58. The elastomer sleeve 43 has inner surfaces 62 and 64 which mount on outer surfaces 56*a* and 58*a* of the outer races of the bearings 56 and 58. The surfaces 62 and 64 are separated by a member 60 which extends inwardly about midway between the ends of the sleeve 43 and in between the bearings 56 and 58. The member 60 prevents the sleeve 43 from sliding off of the bearings 56 and 58 during use. It should be noted that the inner surfaces 62 and 64 of the sleeve are not bonded to the bearings as is done in the prior art but are mounted on the outer surfaces 56*a* and 58*a* of the bearings 56 and 58 to permit relative motion between such adjacent surfaces.

Preferably the elastomer sleeve 43 is formed of a distortable resilient material such as polyurethane having a hardness of 55 Shore "D."

The bearings 56 and 58 have their inner races pressed on the shaft 54. The inner race of bearing 58 rests against a shoulder 54*b* of the shaft 54 and the inner race of the bearing 56 is forced toward the bearing 58 by means of a spring 53 acting in between the inner race of the bearing 56 and a key 54*a* connected to the shaft 54. The extension 60 of the sleeve 43 is positioned in between the outer races of the bearings 56 and 58.

The width of tape 12 is substantially the same measurement as the distance between bearings 56 and 58 such that the overlapping portions of sleeve 43 extend into engagement with capstan 14. Thus the portion of sleeve 43 in frictional engagement with tape 12 acts as an engaging means, and the portions of the sleeve 43, which engages capstan 14, are clutches used in the engagement and disengagement of the roller to the capstan. The width of tape 12 may be shorter than the distance between bearings 56 and 58, but it is preferred that in no case the tape is wider than the width of the bearings to allow the clutching action between the sleeve and the capstan.

The operation of the present invention will now be described. With the solenoid 44 in the unenergized condition, the capstan 14 is rotated with the tape 12 slipping thereon as described above, and roller 42 is in spaced relation to the tape 12.

The pinch roller 42 is forced into engagement with the capstan 14 by the action of the energized solenoid 44 resulting in deformation of the sleeve 43 at the point of engagement as illustrated in FIG. 4. Capstan 14 is constantly rotated by motor 11, and continues to frictionally drive the roller 42 and due to the gripping engagement of the tape 12 by the sleeve 43, the tape advances in the manner similar to that described with relation to the prior art.

Because of the construction, engagement of the pinch roller 43 and the capstan 14 causes the elastomer sleeve 43 to deform as indicated at 43*a* and 43*b* on either side of the contact area. However, the surfaces 62 and 64 are movable relative to the bearing surfaces 56*a* and 58*a* and when the forces caused by the engagement of the pinch roller and capstan overcome the frictional forces between the outer races of the bearings and sleeve relative movement takes place reducing stresses and strains and hense heat build up in the sleeve 43 is reduced.

Also, because of the unbonded mounting of the sleeve 43 surfaces 62 and 64 to the bearing surfaces 56*a* and 58*a*, when the forces between the pinch roller 42 and the capstan are sufficient the sleeve 43 will deform to the point that it will permit the sleeve 43 to rotate relative to and at a different velocity from the bearing outer surfaces 56*a* and 58*a*. This may be caused by enlargement of the inside diameter of the sleeve 43 causing a slight separation between the bearing outer surfaces 56 and 58 and the sleeve inner surfaces 62 and 64.

Such a condition is illustrated in an exaggerated manner in FIG. 4. As indicated there is a slight shift in the axis of rotation C of the bearings 56 and 58 with respect to the axis of rotation D of the sleeve 43 and hence a difference in rotational velocity.

The linear velocity of the portion of the sleeve 43 in contact with the capstan 14 is the same as that of the surface of the capstan 14 with which it is in contact. The remainder of the sleeve 43 and the bearings 56, 58 will not be in intimate engagement and free to move in relation therewith. This arrangement allows the bearings 56, 58 and the sleeve 43 to rotate at different velocities.

In the operation of the tape drive mechanism as constructed according to the present invention, the inner surface of the resilient sleeve is not constrained or bonded to the outer surface of the bearing thereby eliminating the possibility of a bond failure as was exhibited by the prior art. In tests conducted using both the prior art pinch roller and a roller constructed in accordance with the present invention, each having the same outside diameters, it was found that the measured rolling resistance and the energy necessary to operate the capstan to be lower by a factor of two to three, when using the present invention. The steady state operating temperature was also found to be lower by 30° F. than with prior art pinch rollers. There is an inherent advantage in using an unbonded sleeve without a metallic roller fabricated from the elastomer since the mass and inertia is substantially less than that exhibited by the prior art bonded metallic roller. This property then allows the roller to be operated under a lower energy level and will necessarily have faster start and stop times by the substitution of the roller constructed according to the present invention on same tape recorder or reproducing equipment.

Figure 6:
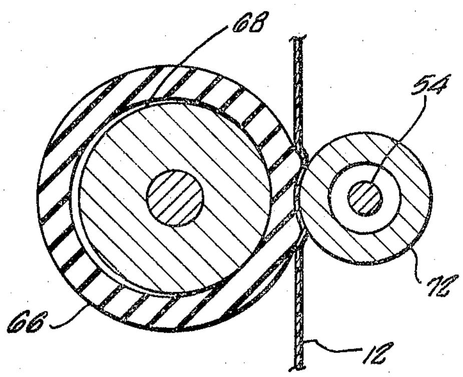
FIG. 6 is a typical cross sectional view of another embodiment of a tape advancing machine constructed according to the present invention.

Another embodiment of the invention is illustrated in FIG. 6 wherein a resilient, deformable, elastomeric sleeve 66 envelops the capstan 68. This embodiment is similar to the embodiment of FIGS. 1–5. However, the unbonded sleeve, identified by reference numeral 66, is mounted on a capstan 68. Similar to the previously described embodiment, sleeve 66 is unbonded and slipped over the motor driven capstan 68 and is held thereto by frictional or keyed engagement. Sleeve 66 may rotate or shift relative to capstan 68 and will react similarly to that previously described in regard to FIGS. 3–5.

In operation, the capstan 68 is constantly driven with the tape 12 lying closely thereon due to the pinch roller 72 not in engagement. Shaft 54 supports and moves pinch roller 72 in a manner equivalent to the arrangement illustrated in FIG. 3. Thus, as shaft 54 is shifted towards the capstan 68 with pinch roller 72 frictionally engaged with tape 12, sleeve 66 is distorted, thereby causing tape 12 to be driven by the constantly rotating capstan 68 and sleeve 66.

FIG. 7 illustrates a misaligned pinch roller and capstan and embodies the present invention. Referring to FIG. 7, the roller engages tape 12 and capstan 14 in much the same manner as illustrated in FIG. 5. However, the axis C of roller 42 is canted with relation to axis A of capstan 14. This canting action naturally places more force along one edge of the tape as contrasted to the opposite edge, and aids in constantly keeping tape 12 in alignment with relation to the capstan and roller. By this canting arrangement, precise alignment of the tape is not required, and the alignment of the tape with a reading head (not shown) is gained without external alignment means.

A fundamental difference between prior art and the present invention is that in the present invention the canting tends to elastically deflect the portion of the pinch roller elastomer which extends beyond the bearing. The presence of the metal sleeve in the prior art would cause severe straining of the elastomer with attendant higher internal friction losses due to the greater straining of the elastomer.

While in the foregoing description in the accompanying drawings there are disclosed a single embodiment of the present invention as applied to a recording device using tape, it is to be understood that the various modifications, omissions and refinements which depart from these particular embodiments may be adopted without departing from the spirit of this invention.

What is claimed is:

1. In apparaus for moving a strip of material the combination comprising:
- a pinch roller for causing a strip of material to engage another roller and be moved thereby, said pinch roller comprising
  - a pair of spaced apart bearings each having an outer rotatable race comprising a mounting surface and
  - an elastic member encircling said mounting surfaces having a surface adjoining and mounted on said mounting surfaces to permit relative movement between adjoining surfaces of said elastic member and said outer races.

2. In apparatus for moving a strip of material the combination comprising:
- a pinch roller for causing a strip of material to engage another roller and be moved thereby, said pinch roller comprising
  - a pair of spaced apart structures each having an outer rotatable surface and
  - an elastic member encircling said rotatable surfaces and having a surface mounted on said rotatable surfaces to permit relative movement between adjoining surfaces of said spaced apart structures and said elastic member.

3. In apparatus for moving a strip of material the combination comprising:
- a pinch roller for causing a strip of material to engage another roller and be moved thereby, said pinch roller comprising
  - a pair of spaced apart bearings each having an outer rotatable race comprising a mounting surface,
  - an elastomer sleeve having an inner surface which encircles and is in contact with said mounting surfaces completely around thereof in the absense of such engagement, said inner surface being mounted on said mounting surfaces to permit relative movement between adjoining surfaces of said elastomer sleeve and said outer races.

4. In apparatus for moving a strip of material, the combination comprising:
- a first roller,
- a second roller for engaging a strip of material between said first roller and said second roller for moving such strip of material, said second roller comprising
  - a rotatable member having in cross section a circular outer surface and
  - an elastomer member encircling said outer surface and having an inner surface mounted on said rotatable member outer surface to permit relative movement between adjoining surfaces of said elastic member and said rotatable member to thereby relieve stresses in said elastic and circular member upon engagement and rotation of the rollers and
- means for moving said first and second rollers relative to each other into engagement for moving such strip of material.

5. In apparatus having a rotatable capstan for moving a strip of material the combination comprising:
- a pinch roller for causing a strip of material to engage a capstan and be moved thereby, said pinch roller comprising
  - a pair of spaced apart bearings each having an outer rotatable race with a mounting surface,
  - an elastomer sleeve having a surface adjoining and mounted on said mounting surfaces to permit relative movement between adjoining surfaces of said elastomer sleeve and outer races and
  - an extension of said elastomer sleeve extending in between said bearings to thereby prevent said sleeve from slipping off of said mounting surfaces.

6. In apparatus for moving a strip of material the combination comprising:
- a first roller,
- a pinch roller for engaging a strip of material between said pinch roller and said first roller for moving such strip of material, said pinch roller comprising
  - a rotatable member having in cross section a circular outer surface,
  - an elastic member encircling said rotatable member and having a surface mounted on said rotatable member outer surface to permit relative movement between said elastic member surface and said rotatable member surface upon such engagement and rotation of the rollers, and
  - a member interconnecting said rotatable member and elastic member to thereby prevent the elastic member from slipping off said rotatable member and to permit said relative movement and
- means for moving said pinch roller and first roller relative to each other and into engagement causing such strip of material to be moved.

7. In apparatus for moving a strip of material, the combination comprising:
- a first roller,
- a second roller for engaging a strip of material between said first roller and said second roller for moving such strip of material, said second roller comprising
  - a rotatable member having in cross section a circular outer surface and an elastomer member having an inner surface which encircles and is in contact with said outer surface completely around thereof in the absence of such engagement, said inner surface being mounted on said rotatable member outer surface to permit relative movement between adjoining surfaces of said elastomer member and said rotatable member upon engagement and rotation of said rollers and means for moving said first and second rollers relative to each other into engagement with each other to thereby cause movement of such strip of material.

8. Apparatus for moving a strip of material the combination comprising:

a first roller, a pinch roller for causing a strip of material to engage said first roller and be moved thereby, said pinch roller comprising a pair of spaced apart bearings each having an outer rotatable race comprising a mounting surface and an elastic member encircling said mounting surfaces having a surface adjoining and mounted on said mounting surfaces to permit relative movement between adjoining surfaces of said elastic member and outer races upon engagement and rotation of said first roller and pinch roller, and means for moving said pinch roller and first roller relative to each other and into engagement for moving such strip of material.

9. Apparatus for moving a strip of material the combination comprising:

a first roller, a pinch roller for causing a strip of material to engage said first roller and be moved thereby, said pinch roller comprising a pair of spaced apart bearings each having an outer rotatable race comprising a mounting surface and an elastomer sleeve having at least one inner surface which encircles and is in contact with said mounting surface of each of said bearings completely around thereof in the absence of such engagement, said inner surface being mounted on said mounting surfaces to permit relative movement between adjoining surfaces of said elastomer sleeve and said outer races upon engagement and rotation of said first roller and pinch roller, and means for moving said pinch roller and first roller relative to each other and into engagement for moving such strip of material.

10. In apparatus as defined in claim 9 wherein said elastomer sleeve extends beyond said spaced apart bearings a substantial amount and said first roller is of substantially the same length as said sleeve.

11. In apparatus as defined in claim 10 wherein the distance in between said bearings is substantially equal to the width of such strip of material to be moved.

12. In apparatus for moving a strip of material, the combination comprising:

a first roller, a second roller for engaging a strip of material between said first roller and said second roller for moving such strip of material, said second roller comprising a rotatable cylindrical member having an outer surface and an elastic and circular member having an inner surface encircling and mounted on said rotatable member surface to permit relative movement between adjoining surfaces of said elastic member and said cylindrical member upon engagement and rotation of the rollers, means for moving said first and second rollers relative to each other into engagement for moving such strip of material and means for rotating said cylindrical member.

References Cited by the Examiner

UNITED STATES PATENTS

| | | | |
|---|---|---|---|
| 2,959,334 | 5/1954 | Uritis | 226—191 X |
| 2,998,906 | 9/1961 | Vice | 226—192 X |
| 3,042,281 | 7/1962 | Balvin | 226—191 X |
| 3,077,293 | 2/1963 | Watkins | 226—191 X |

M. HENSON WOOD, Jr., *Primary Examiner.*

R. A. SCHACHER, *Assistant Examiner.*